US012694728B2

(12) United States Patent
Drolet

(10) Patent No.: US 12,694,728 B2
(45) Date of Patent: Jul. 28, 2026

(54) SYSTEMS AND METHODS FOR DETERMINING GAS TURBINE ENGINE OPERATING MARGINS

(71) Applicant: Pratt & Whitney Canada Corp., Longueuil (CA)

(72) Inventor: Martin Drolet, Saint-Amable (CA)

(73) Assignee: Pratt & Whitney Canada Corp., Longueuil (CA)

( * ) Notice: Subject to any disclaimer, the term of this patent is extended or adjusted under 35 U.S.C. 154(b) by 287 days.

(21) Appl. No.: 17/892,799

(22) Filed: Aug. 22, 2022

(65) Prior Publication Data

US 2024/0060426 A1 Feb. 22, 2024

(51) Int. Cl.
*G07C 5/08* (2006.01)

(52) U.S. Cl.
CPC ...... *G07C 5/0808* (2013.01); *F05D 2220/323* (2013.01); *F05D 2260/80* (2013.01)

(58) Field of Classification Search
CPC ............. G07C 5/0808; F05D 2220/323; F05D 2260/80
See application file for complete search history.

(56) References Cited

U.S. PATENT DOCUMENTS

| | | | |
|---|---|---|---|
| 6,681,558 | B2 | 1/2004 | Orlando |
| 8,068,997 | B2 | 11/2011 | Ling |
| 10,956,534 | B2 | 3/2021 | Ling |
| 11,085,321 | B2 | 8/2021 | Ling |
| 2007/0220897 | A1 | 9/2007 | Howlett |
| 2008/0234994 | A1 | 9/2008 | Goebel |
| 2010/0275575 | A1 | 11/2010 | Brown |

(Continued)

FOREIGN PATENT DOCUMENTS

| | | | |
|---|---|---|---|
| CN | 112173169 | A | 1/2021 |

OTHER PUBLICATIONS

O'Brien, "RTO Technical Report 44 Performance Prediction and Simulation of Gas Turbine Engine Operation", Research and Technology Organisation, Apr. 1, 2022, pp. 1-357, http://www.sto.nato.int/publications/STO%20Technical%20Reports/RTO-TR-044/TR-044-$$ALL.pdf.

(Continued)

*Primary Examiner* — Anne Marie Antonucci
*Assistant Examiner* — Patrick M Brady
(74) *Attorney, Agent, or Firm* — Getz Balich LLC

(57) ABSTRACT

A system for a gas turbine engine includes an engine control system. The engine control system includes a processor in communication with a non-transitory memory storing instructions, which instructions when executed by the processor, cause the processor to: obtain a current engine installation configuration for the gas turbine engine, determine a normalized value of the engine parameter for an uninstalled gas turbine engine based on the current engine installation configuration and one or more of a normalized engine power (SHPN) of the gas turbine engine, an airspeed, or an altitude, determine a fully deteriorated engine (FDE) value of the engine parameter using the normalized value of the engine parameter, determine a current value of the engine parameter for the gas turbine engine, and determine the engine operating margin for the engine parameter based on the FDE value of the engine parameter and the current value of the engine parameter.

17 Claims, 6 Drawing Sheets

(56) References Cited

U.S. PATENT DOCUMENTS

| | | | | |
|---|---|---|---|---|
| 2013/0204468 | A1* | 8/2013 | Camhi | G07C 5/0816 701/100 |
| 2016/0153364 | A1* | 6/2016 | Brand | F02C 9/28 60/776 |
| 2016/0273379 | A1* | 9/2016 | Soares, Jr. | B64D 45/00 |
| 2019/0244443 | A1* | 8/2019 | Steinert | G07C 5/085 |
| 2019/0390564 | A1* | 12/2019 | Parsons | F02C 7/05 |
| 2020/0284204 | A1 | 9/2020 | Cafaro | |
| 2020/0398993 | A1 | 12/2020 | Drolet | |
| 2022/0169397 | A1* | 6/2022 | Siemsen | B64D 31/06 |

OTHER PUBLICATIONS

EP search report for EP23192661.9 dated Nov. 28, 2023.

* cited by examiner

SYSTEMS AND METHODS FOR DETERMINING GAS TURBINE ENGINE OPERATING MARGINS

TECHNICAL FIELD

This disclosure relates generally to gas turbine engine operating margins, more particularly, to systems and methods for determining gas turbine engine operating margins.

BACKGROUND OF THE ART

A gas turbine engine for an aircraft may be subject to various operational power checks to verify that the aircraft can satisfy minimum power requirements for a flight or operation. Various systems and methods are known in the art for verifying the operational power capability of a gas turbine engine. While these known systems and methods have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a system for determining an engine operating margin for an engine parameter of a gas turbine engine for an aircraft includes an engine control system. The engine control system includes a processor in communication with a non-transitory memory storing instructions, which instructions when executed by the processor, cause the processor to: obtain a current engine installation configuration for the gas turbine engine, determine a normalized value of the engine parameter for an uninstalled gas turbine engine based on the current engine installation configuration and one or more of a normalized engine power (SHPN) of the gas turbine engine, an airspeed, or an altitude, determine a fully deteriorated engine (FDE) value of the engine parameter using the normalized value of the engine parameter, determine a current value of the engine parameter for the gas turbine engine, and determine the engine operating margin for the engine parameter based on the FDE value of the engine parameter and the current value of the engine parameter.

In any of the aspects or embodiments described above and herein, the instructions, when executed by the processor, may further cause the processor to determine if the engine operating margin decreases below a predetermined threshold margin value for gas turbine engine maintenance.

In any of the aspects or embodiments described above and herein, the engine parameter may be an indicated turbine temperature (ITT).

In any of the aspects or embodiments described above and herein, the engine parameter may be a compressor speed.

In any of the aspects or embodiments described above and herein, the instructions, when executed by the processor, may further cause the processor to: calculate a current engine inlet pressure loss using an engine inlet pressure and an outside ambient pressure, compare the current engine inlet pressure loss to an expected nominal engine inlet pressure loss for the current engine installation configuration to determine an inlet pressure loss correction factor, and apply the inlet pressure loss correction factor to the normalized engine power (SHPN).

According to another aspect of the present disclosure, a method for determining an engine operating margin for an engine parameter of a gas turbine engine for an aircraft includes: identifying a current engine installation configuration for the gas turbine engine, determining a normalized value of the engine parameter for an uninstalled gas turbine engine based on the current engine installation configuration and one or more of a normalized engine power (SHPN) of the gas turbine engine, an airspeed, or an altitude, determining a fully deteriorated engine (FDE) value of the engine parameter using the normalized value of the engine parameter, determining a current value of the engine parameter for the gas turbine engine, and determining the engine operating margin for the engine parameter based on the FDE value of the engine parameter and the current value of the engine parameter.

In any of the aspects or embodiments described above and herein, the engine parameter may be an indicated turbine temperature (ITT).

In any of the aspects or embodiments described above and herein, the engine parameter may be a high-pressure compressor speed (NH).

In any of the aspects or embodiments described above and herein, the method may further include identifying the engine operating margin decreasing below a predetermined threshold margin value for gas turbine engine maintenance.

In any of the aspects or embodiments described above and herein, the method may further include: determining a scaling factor based on SHPN, altitude, current ISA deviation, and the current engine installation configuration and applying the scaling factor to the expected normalized value of the engine parameter.

In any of the aspects or embodiments described above and herein, the method may further include: determining an accessory extraction load for the gas turbine engine, determining an accessory extraction load correction factor using the normalized engine power (SHPN), the altitude, and the accessory extraction load, adding the accessory extraction load correction factor to the expected normalized value of the engine parameter.

In any of the aspects or embodiments described above and herein, the step of determining the current value of the engine parameter for the gas turbine engine may include measuring the engine parameter using one or more sensors of the gas turbine engine.

In any of the aspects or embodiments described above and herein, the step of determining the current value of the engine parameter may include estimating the current value of the engine parameter using a computer-implemented model.

In any of the aspects or embodiments described above and herein, the step of determining the FDE value of the engine parameter may include determining a deterioration correction factor for the FDE value. The deterioration correction factor may be based on one or more operational characteristics of a compressor of the gas turbine engine.

According to another aspect of the present disclosure, a gas turbine engine for an aircraft includes an air inlet, a first rotational assembly, a second rotational assembly, an exhaust section, and an engine control system. The first rotational assembly includes a first shaft, a bladed first compressor rotor, and a bladed first turbine rotor. The first shaft interconnects the bladed first compressor rotor and the bladed first turbine rotor. The second rotational assembly include a second shaft, a bladed second compressor rotor, and a bladed second turbine rotor. The second shaft interconnects the bladed second compressor rotor and the bladed second turbine rotor. The air inlet, the first rotational assembly, the second rotational assembly, and the exhaust section form a core flow path of the gas turbine engine. The engine control system includes a processor in communication with a non-transitory memory storing instructions, which instructions when executed by the processor, cause the processor to: determine a normalized value of an engine parameter for an uninstalled engine based on a normalized engine power (SHPN) of the gas turbine engine, an airspeed, and an altitude, determine a fully deteriorated engine (FDE) value of the engine parameter of the gas turbine engine using the normalized value of the engine parameter, determine a current value of the engine parameter for the gas turbine engine, and determine an engine operating margin for the engine parameter based on the FDE value of the engine parameter and the current value of the engine parameter.

In any of the aspects or embodiments described above and herein, the instructions, when executed by the processor, may further cause the processor to obtain a current engine installation configuration for the gas turbine engine. The normalized value of an engine parameter may be determined for the current engine installation configuration.

In any of the aspects or embodiments described above and herein, the engine control system may include a plurality of sensors.

In any of the aspects or embodiments described above and herein, the plurality of sensors may include at least a speed sensor for the first rotational assembly and a torque sensor for the first rotational assembly. The step of determining the normalized value of the engine parameter for the uninstalled engine based on the normalized engine power (SHPN) of the gas turbine engine may include determining the normalized engine power (SHPN) using a rotational speed measured by the speed sensor and a torque measured by the torque sensor.

In any of the aspects or embodiments described above and herein, the current engine installation configuration includes an air inlet configuration.

In any of the aspects or embodiments described above and herein, the current engine installation configuration includes an exhaust section configuration.

The present disclosure, and all its aspects, embodiments and advantages associated therewith will become more readily apparent in view of the detailed description provided below, including the accompanying drawings.

DETAILED DESCRIPTION

Figure 1:
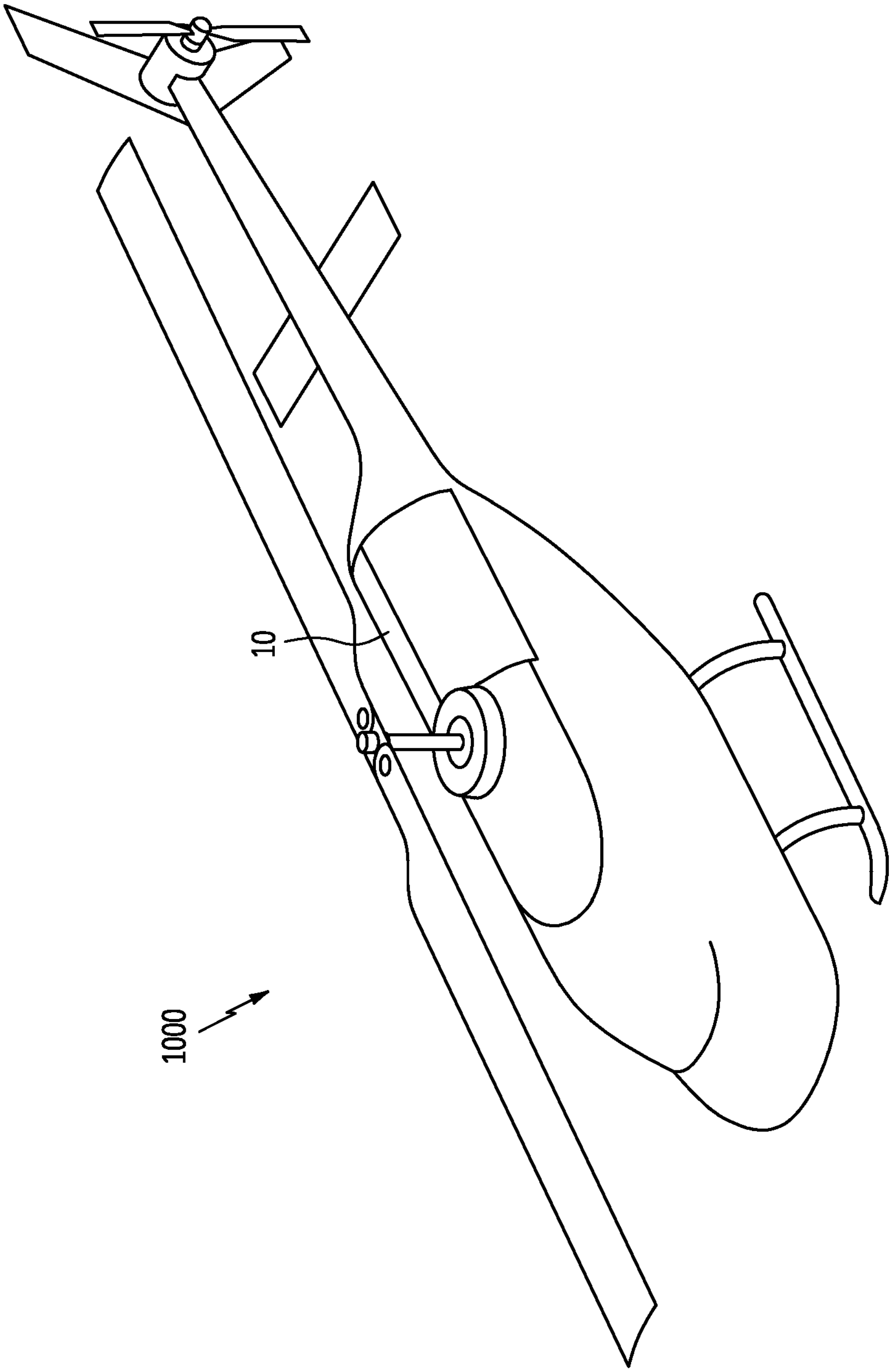
FIG. 1 illustrates a perspective view of an exemplary aircraft including a gas turbine engine system, in accordance with one or more embodiments of the present disclosure.

FIG. 1 illustrates a perspective view of an exemplary aircraft 1000 including a gas turbine engine system 10. The aircraft 1000 of FIG. 1 is configured as a rotorcraft (e.g., a helicopter), however, the present disclosure is also applicable to other aircraft configurations such as, but not limited to, fixed-wing aircraft.

Figure 2:
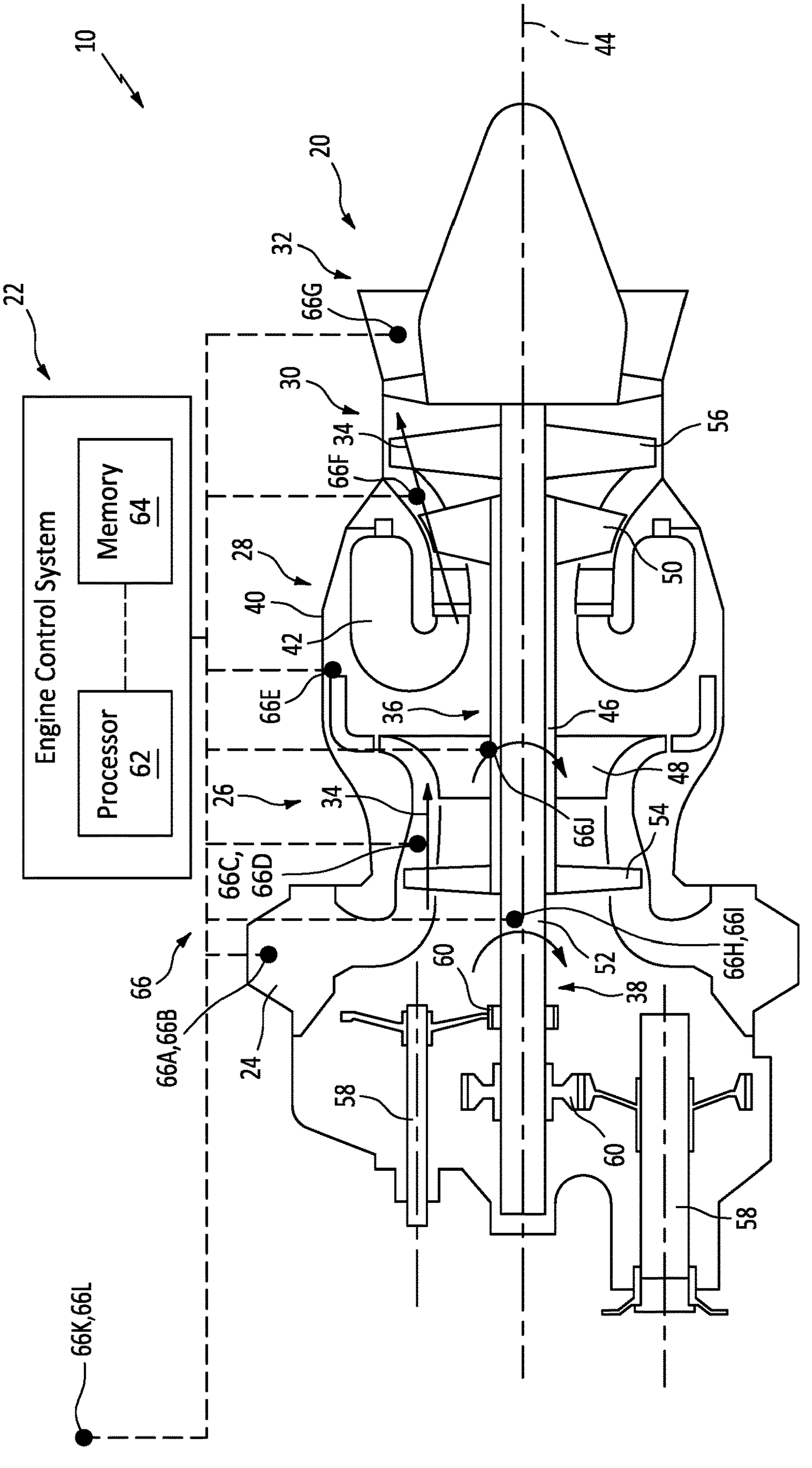
FIG. 2 illustrates a schematic view of a gas turbine engine system, in accordance with one or more embodiments of the present disclosure.

FIG. 2 schematically illustrates the gas turbine engine system 10. The gas turbine engine system 10 of FIG. 2 includes a gas turbine engine 20 and an engine control system 22. The gas turbine engine 20 of FIG. 2 is a multi-spool turboshaft gas turbine engine. However, while the following description and accompanying drawings may refer to the turboshaft gas turbine engine of FIG. 2 as an example, it should be understood that aspects of the present disclosure may be equally applicable to other types of gas turbine engines including, but not limited to, a turbofan gas turbine engine, a turboprop gas turbine engine, a turbojet gas turbine engine, a propfan gas turbine engine, an open rotor gas turbine engine, an auxiliary power unit (APU), or the like. The gas turbine engine 20 of FIG. 2 includes an air inlet 24, a compressor section 26, a combustor section 28, a turbine section 30, and an exhaust section 32. The compressor section 26 drives air from the air inlet 24 along a core flow path 34 for compression and communication into the combustor section 28, expansion through the turbine section 30, and exhaust from the gas turbine engine 20 via the exhaust section 32.

The gas turbine engine 20 of FIG. 2 includes a first rotational assembly 36 (e.g., a high-pressure spool) and a second rotational assembly 38 (e.g., a low-pressure spool), an engine static structure 40 (e.g., an engine case, a bearing compartment case, etc.), and an annular combustor 42. It should be understood that "low pressure" and "high pressure" or variations thereof as used herein are relative terms indicating that the high pressure is greater than the low pressure. The first rotational assembly 36 and the second rotational assembly 38 are mounted for rotation about an axial centerline 44 (e.g., a rotational axis) of the gas turbine engine 20 relative to the engine static structure 40.

The first rotational assembly 36 includes a first shaft 46, a bladed first compressor rotor 48 (e.g., of a high-pressure compressor of the compressor section 26), and a bladed first turbine rotor 50 (e.g., of a high-pressure turbine of the turbine section 30). The first shaft 46 interconnects the bladed first compressor rotor 48 and the bladed first turbine rotor 50. The second rotational assembly 38 includes a second shaft 52, a bladed second compressor rotor 54 (e.g., of a low-pressure compressor of the compressor section 26), and a bladed second turbine rotor 56 (e.g., of a low-pressure turbine of the turbine section 30). The second shaft 52 interconnects the bladed second compressor rotor 54 and the bladed second turbine rotor 56. The second shaft 52 may additionally be connected to one or more rotational loads 58, for example, directly or by one or more speed-reducing gear assemblies 60. The combustor 42 of FIG. 2 is disposed between the bladed first compressor rotor 48 and the bladed first turbine rotor 50 along the core flow path 34.

In operation, airflow along the core flow path 34 is compressed by the bladed first compressor rotor 48 and the bladed second compressor rotor 54, mixed and burned with fuel in the combustor 42, and then expanded across the bladed first turbine rotor 50 and the bladed second turbine rotor 56. The bladed first turbine rotor 50 and the bladed second turbine rotor 56 rotationally drive the first rotational assembly 36 and the second rotational assembly 38, respectively, in response to the expansion of the combustion gases. The first shaft 46 and the second shaft 52 are concentric and rotate about the axial centerline 44, which axial centerline 44 is collinear with respective rotational axes of the first shaft 46 and the second shaft 52.

The engine control system 22 of FIG. 2 includes a processor 62 and memory 64. The memory 64 is in signal communication with the processor 62. The processor 62 may include any type of computing device, computational circuit, or any type of process or processing circuit capable of executing a series of instructions that are stored in the memory 64, thereby causing the processor 62 to perform or control one or more steps or other processes. The processor 62 may include multiple processors and/or multicore CPUs and may include any type of processor, such as a microprocessor, digital signal processor, co-processors, a microcontroller, a microcomputer, a central processing unit, a field programmable gate array, a programmable logic device, a state machine, logic circuitry, analog circuitry, digital circuitry, etc., and any combination thereof. The instructions stored in memory 64 may represent one or more algorithms for controlling the aspects of the gas turbine engine 20, and the stored instructions are not limited to any particular form (e.g., program files, system data, buffers, drivers, utilities, system programs, etc.) provided they can be executed by the processor 62. The memory 64 may be a non-transitory computer readable storage medium configured to store instructions that when executed by one or more processors, cause the one or more processors to perform or cause the performance of certain functions. The memory 64 may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the engine control system 22 may be achieved via the use of hardware, software, firmware, or any combination thereof. The engine control system 22 may also include input and output devices (e.g., keyboards, buttons, switches, touch screens, video monitors, sensor readouts, data ports, etc.) that enable the operator to input instructions, receive data, etc.

The engine control system 22 may form or otherwise be part of an electronic engine controller (EEC) for the gas turbine engine 20. The EEC may control operating parameters of the gas turbine engine 20 including, but not limited to, fuel flow, stator vane position, compressor air bleed valve position, etc. so as to control an engine power and/or thrust of the gas turbine engine 10. In some embodiments, the EEC may be part of a full authority digital engine control (FADEC) system for the gas turbine engine 20.

The engine control system 22 receives data associated with operation of the gas turbine engine 20 and/or the aircraft 1000 (see FIG. 1). The data may include operational parameters (e.g., pressure, temperature, rotation speed, torque, etc.) for the gas turbine engine 20. The engine control system 22 may include and be in communication (e.g., signal communication) with one or more sensors 66 distributed throughout the gas turbine engine 20 and/or the aircraft 1000. The sensors 66 may include, but are not limited to, one or more of the following: an engine inlet pressure (P1) sensor 66A, an engine inlet temperature (T1) sensor 66B, compressor pressure (P2.*x*) sensors 66C at one or more compressor (e.g., a low-pressure compressor, a high-pressure compressor, etc.) stages, compressor temperature (T2.*x*) sensors 66D at one or more compressor (e.g., a low-pressure compressor, a high-pressure compressor, etc.) stages, a compressor outlet pressure (P3) sensor 66E, temperature (T4.*x*) sensors 66F at one or more turbine (e.g., a low-pressure turbine, a high-pressure turbine, etc.) stages, a turbine exhaust temperature (T6) sensor 66G, a rotation speed (NL/Np) sensor 66H for the second shaft 52 (e.g., a low-pressure compressor speed sensor), a torque sensor 66I for the second shaft 52, a rotation speed (NH/Ng) sensor 66J for the first shaft 46 (e.g., a high-pressure compressor speed sensor), an outside air temperature (OAT) sensor 66K, and/or an outside ambient pressure (Pamb) sensor 66L. The engine control system 22 may be configured to receive data from other sensors or equipment associated with the aircraft 1000 such as, but not limited to, altitude (e.g., measured or derived using outside ambient pressure (Pamb), RADAR, International Standard Atmosphere (ISA) pressure altitude, etc.), (e.g., calibrated airspeed (VCAS)), ISA temperature deviation (e.g., a difference between an actual temperature and the International Standard Atmosphere (ISA) temperature for a particular altitude), an accessory extraction load (e.g., a measure of bleed air, electricity, or other energy source supplied by a gas turbine engine to the aircraft 1000), and/or an environmental control system (ECS) bleed extraction load (e.g., a measure of bleed air supplied by a gas turbine engine to an ECS of the aircraft 1000). Additionally or alternatively, data associated with operation of the gas turbine engine 20 and/or the aircraft 1000 may be obtained from one or more data tables (e.g., data tables stored in the memory 64), which data tables may include expected operational parameters associated with various operational conditions for the gas turbine engine 20 and/or the aircraft 1000. Additionally or alternatively, data associated with operation of the gas turbine engine 20 and/or the aircraft 1000 may be derived or modeled by the engine control system 22. For example, the engine control system 22 may include instructions which, when executed, allow the engine control system 22 to execute a model (e.g., a computer-implemented model) of one or more operational parameters of the gas turbine engine 20 and/or the aircraft 1000 in a virtual (e.g., digital) environment which closely represents the physical system (e.g., a component, assembly, system, etc. of a gas turbine engine) by accounting for factors such as, but not limited to, kinematics, static and dynamic behaviors, component surface characteristics, component geometry, shaft torque, engine power, pressure, temperature, altitude, vibration, and the like. The engine control system 22 may include instructions which, when executed, cause one or more machine learning algorithms to estimate one or more operational parameters of the gas turbine engine 20 and/or the aircraft 1000.

Gas turbine engines may undergo periodical engine power assurance checks (EPAC) to verify that the gas turbine engine and/or the aircraft 1000 (see FIG. 1) can satisfy the minimum power requirements for a planned flight or operation. The EPAC may be used to estimate one or more engine operating margins for one or more engine parameters the gas turbine engine. The available engine operating margins may provide an indication of the engine operational time and/or capability which is available before the gas turbine engine should undergo maintenance (e.g., a periodic overhaul).

Conservative estimates of the engine operating margins may cause a gas turbine engine to be removed from service prematurely for maintenance, thereby preventing the gas turbine engine from achieving its expected engine Time Between Overhaul (TBO).

Figure 3:
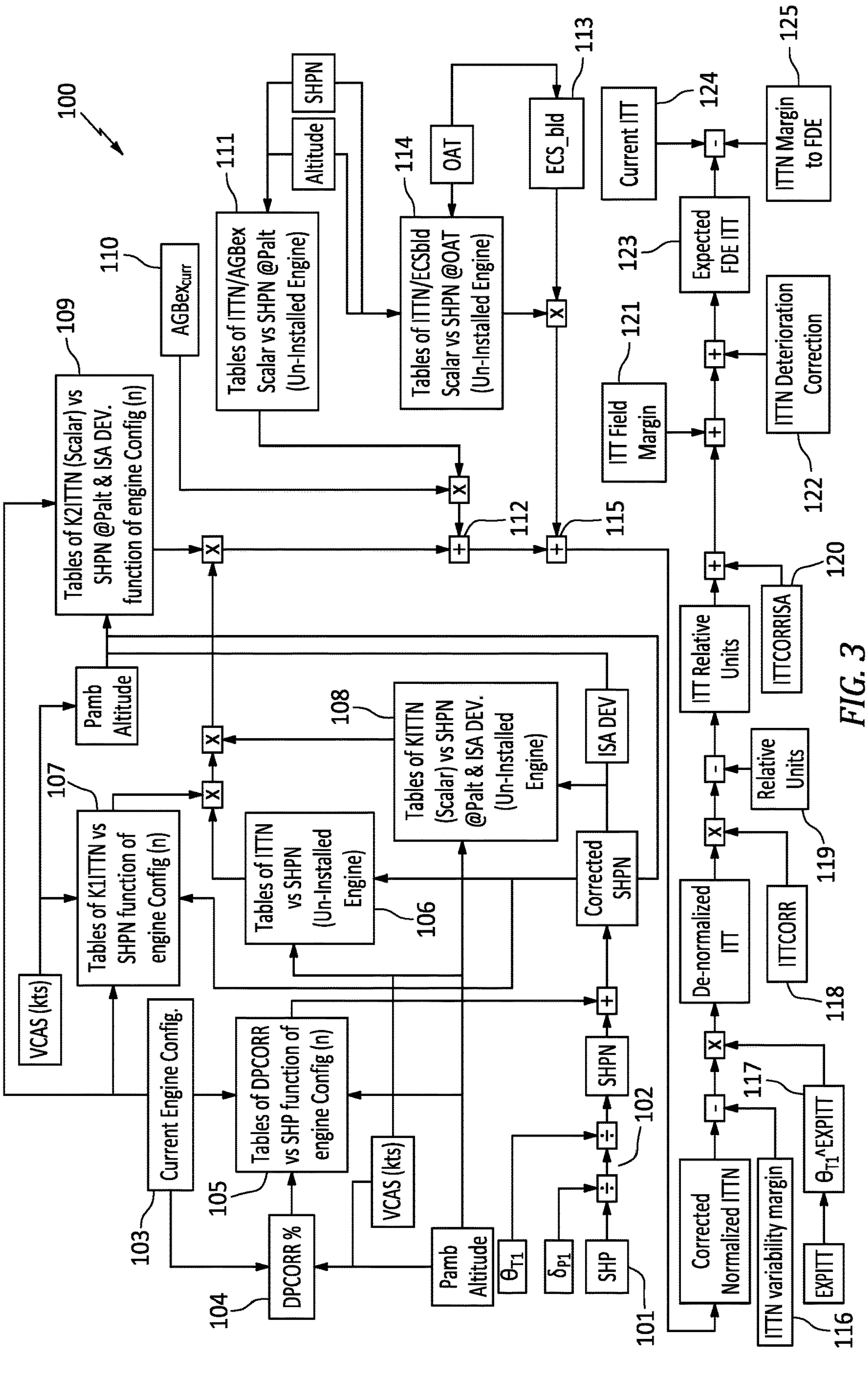
FIG. 3 illustrates a flowchart depicting a method for determining an indicated turbine temperature (ITT) margin for a gas turbine engine, in accordance with one or more embodiments of the present disclosure.

Referring to FIGS. 2 and 3, a Method 100 for determining an indicated turbine temperature (ITT) margin for a gas turbine engine (e.g., the gas turbine engine 20) installed on an aircraft (e.g., the aircraft 1000) is provided. FIG. 3 illustrates a flowchart for the Method 100. The Method 100 may be performed using the gas turbine engine 20 and engine control system 22. For example, the processor 62 may execute instructions stored in memory 64, thereby causing the engine control system 22 and/or its processor 62 to execute or otherwise control one or more steps of the Method 100. However, while the Method 100 may be described herein with respect to the gas turbine engine 20 and/or the engine control system 22, the present disclosure Method 100 is not limited to use with the gas turbine engine 20 and/or engine control system 22. Unless otherwise noted herein, it should be understood that the steps of Method 100 are not required to be performed in the specific sequence in which they are discussed below and, in some embodiments, the steps of Method 100 may be performed separately or simultaneously. In addition, unless otherwise noted herein, it should be understood that various steps (e.g., correction factor steps) of the Method 100 may be optional and, thus, may not be essential for determining an ITT margin for a gas turbine engine.

In Step 101, a current engine power (SHP) for the gas turbine engine 20 may be obtained or otherwise determined. The current engine power (SHP) may be calculated, for example, using the rotation speed (NL/Np) of the second shaft 52 and the torque (e.g., measured torque) for the second shaft 52.

In Step 102, the current engine power (SHP) may be normalized to the engine inlet pressure (P1, $\delta_{P1}$, where δ is a given pressure (e.g., P1) divided by a reference pressure (e.g., sea-level ISA static pressure)) and the engine inlet temperature (T1, $\Theta_{T1}$ where Θ is a given temperature (e.g., T1) divided by a reference temperature (e.g., sea-level static ISA temperature)) to obtain the current normalized engine power (SHPN). The current engine power (SHP) may alternatively be normalized using other operational parameters (e.g., other pressure and temperature parameters) of the gas turbine engine 20 such as, but not limited to, the outside ambient pressure (Pamb) and the outside air temperature (OAT).

In Step 103, a current engine installation configuration for the gas turbine engine 20 may be selected or otherwise determined. For example, a user may input current engine installation configuration characteristics of the gas turbine engine 20 to the engine control system 22. Additionally or alternatively, current engine installation configuration characteristics of the gas turbine engine 20 may be stored in the memory 64. The current engine installation configuration may include structural configurations or accessories of the gas turbine engine 20 and/or the aircraft 1000 (see FIG. 1) which may be expected to affect an inlet pressure loss for the gas turbine engine 20 and, hence, may affect the ITT margin for the gas turbine engine 20. Characteristics of the current engine installation configuration may include, but are not limited to, configurations of the air inlet 24 and/or the exhaust section 32 of the gas turbine engine 20 and/or the aircraft 1000. Examples of the air inlet 24 and/or the exhaust section 32 configurations may include, but are not limited to, air inlet filters, air inlet inertial particle separators, air inlet foreign object debris (FOD) screens, air inlet anti-icing and/or de-icing systems, exhaust emissions treatments systems, exhaust infra-red suppression systems, and the like. The engine installation configuration may include an installation configuration of the gas turbine engine 20 on the aircraft 1000. The engine installation configuration may include features (e.g., structural features, accessories, etc.) of the aircraft 1000 on which or within which the gas turbine engine 20 may be installed.

In Step 104, a correction factor (DPCORR) for a current engine inlet pressure loss of the gas turbine engine 20 may be selected or otherwise determined. Determining the correction factor (DPCORR) may include calculating the current engine inlet pressure loss using the engine inlet pressure (P1) and the outside ambient pressure (Pamb). The current engine inlet pressure loss may be compared to an expected nominal engine inlet pressure loss value for the selected current engine installation configuration to determine the correction factor (DPCORR). The expected nominal engine inlet pressure loss value may be a function of altitude and airspeed (e.g., VCAS) for the selected current engine installation configuration.

In Step 105, a correction factor for the current normalized engine power (SHPN) may be selected or otherwise determined. The correction factor may be applied to the current normalized engine power to correct for variable inlet loss effects of the gas turbine engine 20. The correction factor for the current normalized engine power (SHPN) may be determined, for example, using one or more data tables including the correction factor (DPCORR) vs. the current engine power (SHP) as a function of the selected current engine installation configuration.

Figure 4:
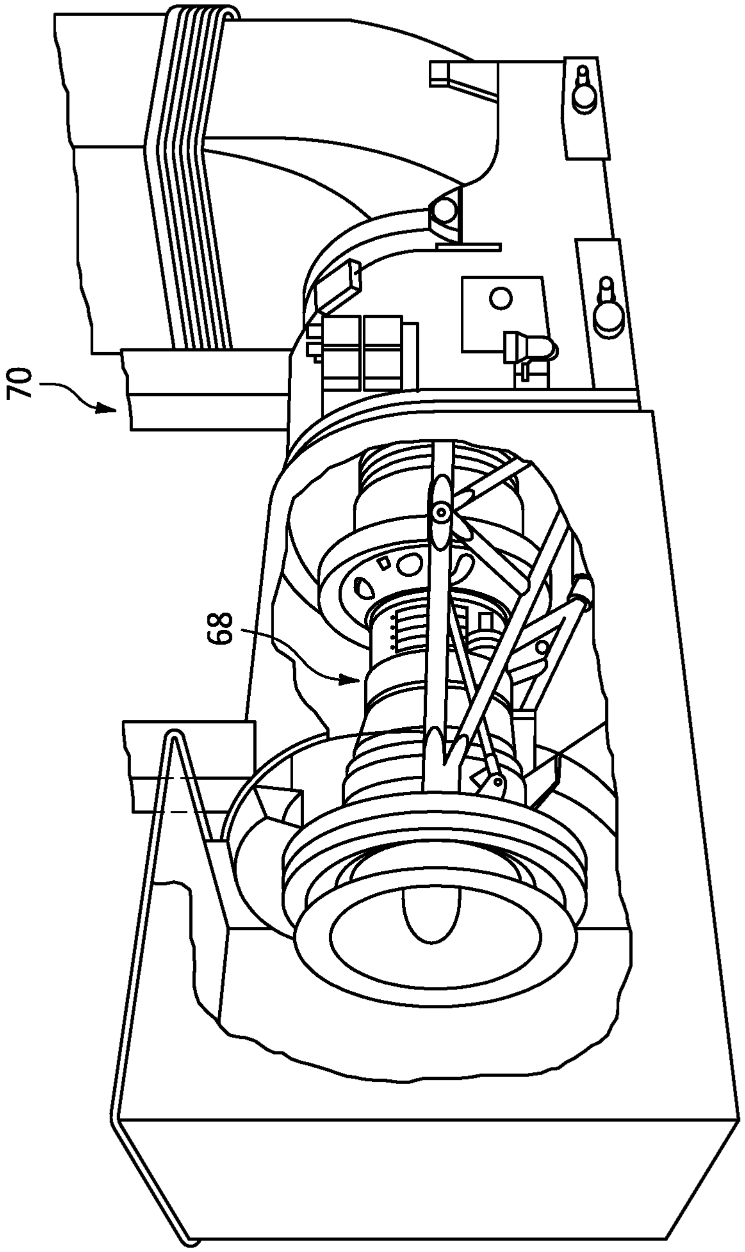
FIG. 4 illustrates a perspective cutaway view of an exemplary uninstalled gas turbine engine in a land-based facility, in accordance with one or more embodiments of the present disclosure.

In Step 106, a normalized ITT value (ITTN) for an uninstalled gas turbine engine may be selected or otherwise determined using the corrected current normalized engine power (SHPN), airspeed (e.g., VCAS), and altitude. The uninstalled gas turbine engine represents a gas turbine engine which is installed in a controlled test environment and which does not include the current engine installation configuration (e.g., the air inlet 24 and/or the exhaust section 32 configurations) of the gas turbine engine 20 and the aircraft 1000. FIG. 4 illustrates an exemplary uninstalled gas turbine engine 68. The uninstalled gas turbine engine 68 of FIG. 4 may be operated in a land-based facility 70. The facility 70 may facilitate operation of the uninstalled gas turbine engine 68 in a controlled test environment (e.g., controlled ambient temperature, ambient pressure, and other operational conditions), in which the uninstalled gas turbine engine 68 may experience optimal performance. Experimental test data collected during operation of the uninstalled gas turbine engine 68 may be stored in memory 64 and used in the implementation of the Method 200.

The uninstalled normalized ITT value (ITTN) for the uninstalled gas turbine engine 68 may be determined based on the corrected current normalized engine power (SHPN), airspeed (e.g., VCAS), altitude, and the selected current engine configuration (e.g., using one or more data tables associated with the uninstalled gas turbine engine 68). Selecting or otherwise determining the uninstalled normalized ITT value (ITTN) may include using one or more data tables including the normalized ITT value (ITTN) vs. the corrected normalized engine power (SHPN) as a function of the selected current engine configuration.

In Step 107, a first scaling factor (K1ITTN) may be selected or otherwise determined for the uninstalled normalized ITT value (ITTN). The scaling factor (K1ITTN) may be selected or otherwise determined using the corrected current normalized engine power (SHPN), altitude, and the selected current engine installation configuration. For example, a normalized ITT value (ITTN) for the gas turbine engine 20 and the aircraft 1000 may be determined (e.g., modeled) using the selected current engine installation configuration. The first scaling factor (K1ITTN) may be applied to the uninstalled normalized ITT value (ITTN) to correct the uninstalled normalized ITT value (ITTN) to represent the gas turbine engine 20 with the selected current engine installation configuration.

In Step 108, a second scaling factor (KITTN) may be selected or otherwise determined for the uninstalled normalized ITT value (ITTN). The second scaling factor (KITTN) may be selected using the corrected current normalized engine power (SHPN), altitude, and the current ISA Deviation. The scaling factor (KITTN) may then be applied to the uninstalled normalized ITT value (ITTN). The expected normalized ITT value (ITTN) of Step 106 may be selected or otherwise determined, for example, using International Standard Atmosphere (ISA) temperature values which may be different than the actual outside air temperature (OAT). The scaling factor (KITTN) may be used to compensate for differences between the ISA temperature and the actual outside air temperature (OAT).

In Step 109, a third scaling factor (K2ITTN) may be selected or otherwise determined using the corrected current normalized engine power (SHPN), altitude, current ISA Deviation, and the selected current engine configuration. The third scaling factor (K2ITTN) may then be applied to the uninstalled normalized ITT value (ITTN). The third scaling factor (K2ITTN) may be applied to the uninstalled normalized ITT value (ITTN) to further correct the uninstalled normalized ITT value (ITTN) to represent the gas turbine engine 20 with the selected current engine installation configuration for the current atmospheric conditions (e.g., the outside air temperature (OAT) for the gas turbine engine 20 and the aircraft 1000.

In Step 110, an accessory extraction load (AGB ex_curr) may be obtained or otherwise determined for the gas turbine engine 20 and the aircraft 1000 (see FIG. 1). The accessory extraction load (AGB ex_curr) may be represented as a value of power (e.g., horsepower (HP)). Obtaining the accessory extraction load (AGB ex_curr) may include measuring a current (e.g., a real time) value of the accessory extraction load (AGB ex_curr) for the aircraft 1000. Alternatively, a value of the accessory extraction load (AGB ex_curr) may be estimated. The estimated accessory extraction load (AGB ex_curr) may be a fixed value. Alternatively, the accessory extraction load (AGB ex_curr) may be a function of one or more operational parameters of the gas turbine engine 20 and/or the aircraft 1000 such as, but not limited to, outside air temperature (OAT), altitude, normalized engine power (SHPN), etc. Alternatively, a zero (0) value may be assumed for the accessory extraction load (AGB ex_curr) to yield a more conservative value for the determined indicated turbine temperature (ITT) margin of the present disclosure Method 100.

In Step 111, an uninstalled normalized ITT value (ITTN) correction factor (e.g., a scalar factor) may be obtained or otherwise determined. The uninstalled normalized ITT value (ITTN) correction factor may be a function of the current normalized engine power (SHPN) and altitude, multiplied by the accessory extraction load (AGB ex_curr). The uninstalled normalized ITT value (ITTN) correction factor may be determined using one or more data tables and/or on-board engine models (e.g., executed by the engine control system 22) with various values of the accessory extraction load (AGB ex_curr) to estimate a sensitivity of the particular gas turbine engine 20 to accessory loads.

In Step 112, the uninstalled normalized ITT value (ITTN) may be added to the uninstalled normalized ITT value (ITTN) correction factor.

In Step 113, the environmental control system (ECS) bleed extraction load (ECS_bld) may be obtained or otherwise determined. Obtaining the environmental control system (ECS) bleed extraction load (ECS_bld) may include measuring a current (e.g., a real time) value of the environmental control system (ECS) bleed extraction load (ECS_bld) for the aircraft 1000. Alternatively, a value of the environmental control system (ECS) bleed extraction load (ECS_bld) may be estimated. The estimated environmental control system (ECS) bleed extraction load (ECS_bld) may be a fixed value. Alternatively, the environmental control system (ECS) bleed extraction load (ECS_bld) may be a function of one or more operational parameters of the gas turbine engine 20 and/or the aircraft 1000 such as, but not limited to, outside air temperature (OAT), altitude, normalized engine power (SHPN), etc. Alternatively, a zero (0) value may be assumed for the environmental control system (ECS) bleed extraction load (ECS_bld) to yield a more conservative value for the determined indicated turbine temperature (ITT) margin of the present disclosure Method 100.

In Step 114, an uninstalled normalized ITT value (ITTN) correction factor (e.g., a scalar factor) may be obtained or otherwise determined. The uninstalled normalized ITT value (ITTN) correction factor of Step 114 may be a function of the current normalized engine power (SHPN), altitude, and the outside air temperature (OAT) for the selected current engine installation configuration, which uninstalled normalized ITT value (ITTN) correction factor may then be multiplied by the environmental control system (ECS) bleed extraction load (ECS_bld) obtained in Step 113. The uninstalled normalized ITT value (ITTN) correction factor may be determined using one or more data tables and/or on-board engine models (e.g., executed by the engine control system 22) with various values of the bleed extraction load (ECS_bld) to estimate a sensitivity of the particular gas turbine engine 20 to bleed extraction loads.

In Step 115, the uninstalled normalized ITT value (ITTN) correction factor obtained in Step 114 may be added to the uninstalled normalized ITT value (ITTN) value.

In Step 116, a correction factor may be applied to the uninstalled normalized ITT value (ITTN) to account for engine-to-engine and/or aircraft-to-aircraft variability in the normalized ITT value (ITTN) between different iterations of a new (e.g., as received) gas turbine engines and/or aircraft.

In Step 117, the uninstalled normalized ITT value (ITTN) may be de-normalized using the $\Theta_{T1}$ value to obtain or otherwise determine an absolute ITT value expressed, for example, in absolute units such as, but not limited to Rankine (° R) or Kelvin (° K). The $\Theta_{T1}$ value may be modified by a factor (EXPITT) (e.g., $\Theta_{T1}$^EXPITT) to account for empirical factors.

In Step 118, a correction factor (ITTCORR) may be applied to the ITT value obtained in Step 117 to account for inaccuracy in accessory extraction load (AGB ex_curr) and/or environmental control system (ECS) bleed extraction load (ECS_bld) corrections (or other variable effects).

In Step 119, the ITT value expressed in absolute units may be converted to relative units such as, but not limited to Fahrenheit (° F.) or Celsius (° C.) in preparation for calculating the ITT margin for the gas turbine engine 20.

In Step 120, a correction factor (ITTCORRISA) may be applied to the ITT value to account for ambient temperature effects. The correction factor (ITTCORRISA) may provide additional temperature correction for the ITT value, for example, in addition to the expected normalized ITT value (ITTN) correction factor of Step 109.

In Step 121, an engine ITT field margin may be added to the de-normalized ITT value to obtain or otherwise determine the Fully Deteriorated Engine (FDE) ITT value. The engine ITT field margin may represent an allowable increase in the de-normalized ITT value before the gas turbine engine 20 may need to undergo maintenance (e.g., a periodic overhaul).

In Step 122, an ITT deterioration correction factor may be applied to the FDE ITT value. The ITT deterioration correction factor may be a function of the ITT value (e.g., the ITT value obtained in Step 119) and one or more operational characteristics of a compressor (e.g., a high-pressure compressor and/or a low-pressure compressor) of the gas turbine engine 20 such as, but not limited to fluid flow rate, rotor speed, pressure ratio, temperatures, and the like. The ITT deterioration correction factor may be added to the FDE ITT value to account for non-linear effects of engine deterioration on the FDE ITT value.

In step 123, an expected FDE ITT value may be obtained or otherwise determined based, for example, on the FDE ITT value obtained in Step 121 and optionally the ITT deterioration correction factor applied in Step 122.

In Step 124, a current ITT value for the gas turbine engine 20 is obtained or otherwise determined. The current ITT value may be a temperature value of the core gas in the core flow path 34 downstream of the bladed first turbine rotor 50 (e.g., the high-pressure turbine outlet temperature) and, for example, the temperature value of the core gas in the core flow path 34 between the bladed first turbine rotor 50 and the bladed second turbine rotor 56. The current ITT value may be obtained from direct measurements (e.g., using the temperature sensors 66F), by estimating one or more operational parameters of the gas turbine engine 20 based on predetermined correlations with other known operational parameters, and/or by using on-board engine models (e.g., executed by the engine control system 22) to estimate one or more operational parameters of the gas turbine engine 20.

In Step 125, an available ITT margin is obtained or otherwise determined by subtracting the expected FDE ITT (e.g., obtained from Step 123) from the current ITT value (e.g., obtained from Step 124).

Figure 5:
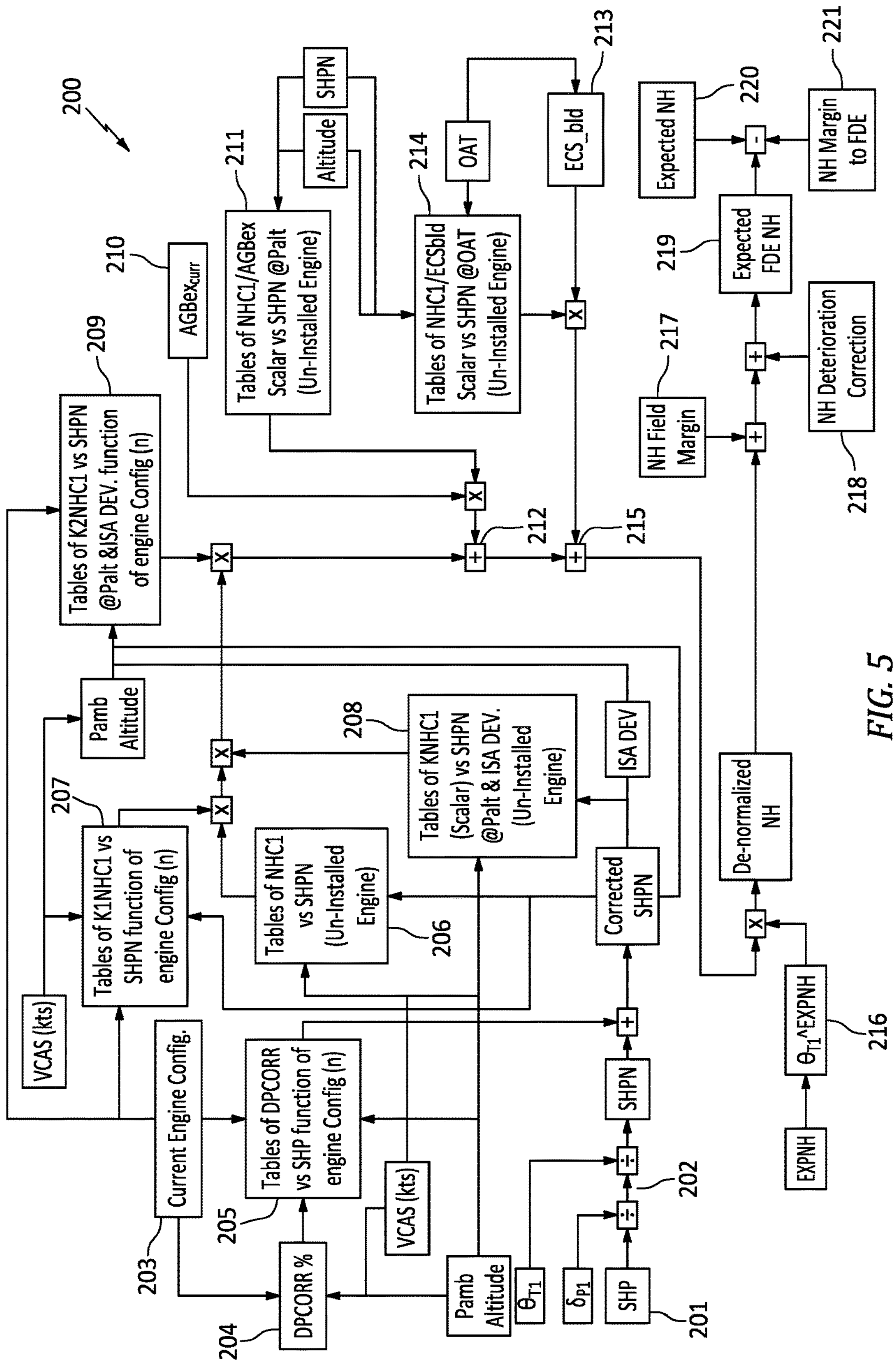
FIG. 5 illustrates a flowchart depicting a method for determining a high-pressure compressor speed (NH) margin for a gas turbine engine, in accordance with one or more embodiments of the present disclosure.

Referring to FIGS. 2 and 5, a Method 200 for determining a compressor (e.g., high-pressure compressor) speed (NH) margin for a gas turbine engine (e.g., the gas turbine engine 20) installed on an aircraft (e.g., the aircraft 1000) is provided. FIG. 5 illustrates a flowchart for the Method 200. The Method 200 may be performed using the gas turbine engine 20 and engine control system 22. For example, the processor 62 may execute instructions stored in memory 64, thereby causing the engine control system 22 and/or its processor 62 to execute or otherwise control one or more steps of the Method 200. However, while the Method 200 may be described herein with respect to the gas turbine engine 20 and/or the engine control system 22, the present disclosure Method 200 is not limited to use with the gas turbine engine 20 and/or engine control system 22. Unless otherwise noted herein, it should be understood that the steps of Method 200 are not required to be performed in the specific sequence in which they are discussed below and, in some embodiments, the steps of Method 200 may be performed separately or simultaneously. In addition, unless otherwise noted herein, it should be understood that various steps (e.g., correction factor steps) of the Method 200 may be optional and, thus, may not be essential for determining a compressor speed (NH) margin for a gas turbine engine.

In Step 201, a current engine power (SHP) for the gas turbine engine 20 may be obtained or otherwise determined. The current engine power (SHP) may be calculated, for example, using the rotation speed (NL/Np) of the second shaft 52 and the torque (e.g., measured torque) for the second shaft 52.

In Step 202, the current engine power (SHP) may be normalized to the engine inlet pressure (P1, $\delta_{P1}$, where δ is a given pressure (e.g., P1) divided by a reference pressure (e.g., sea-level ISA static pressure)) and the engine inlet temperature (T1, $\Theta_{T1}$, where Θ is a given temperature (e.g., T1) divided by a reference temperature (e.g., sea-level static ISA temperature)) to obtain the current normalized engine power (SHPN). The current engine power (SHP) may alternatively be normalized using other operational parameters (e.g., other pressure and temperature parameters) of the gas turbine engine 20 such as, but not limited to, the outside ambient pressure (Pamb) and the outside air temperature (OAT).

In Step 203, a current engine installation configuration for the gas turbine engine 20 may be selected or otherwise determined. For example, a user may input current engine installation configuration characteristics of the gas turbine engine 20 to the engine control system 22. Additionally or alternatively, current engine installation configuration characteristics of the gas turbine engine 20 may be stored in the memory 64. The current engine installation configuration may include structural configurations or accessories of the gas turbine engine 20 and/or the aircraft 1000 (see FIG. 1) which may be expected to affect an inlet pressure loss for the gas turbine engine 20 and, hence, may affect the high-pressure compressor speed (NH) margin for the gas turbine engine 20. Characteristics of the current engine installation configuration may include, but are not limited to, configurations of the air inlet 24 and/or the exhaust section 32 of the gas turbine engine 20 and/or the aircraft 1000. Examples of the air inlet 24 and/or the exhaust section 32 configurations may include, but are not limited to, air inlet filters, air inlet inertial particle separators, air inlet foreign object debris (FOD) screens, air inlet anti-icing and/or de-icing systems, exhaust emissions treatments systems, exhaust infra-red suppression systems, and the like. The engine installation configuration may include an installation configuration of the gas turbine engine 20 on the aircraft 1000. The engine installation configuration may include features (e.g., structural features, accessories, etc.) of the aircraft 1000 on which or within which the gas turbine engine 20 may be installed.

In Step 204, a correction factor (DPCORR) for a current engine inlet pressure loss of the gas turbine engine 20 may be selected or otherwise determined. Determining the correction factor (DPCORR) may include calculating the current engine inlet pressure loss using the engine inlet pressure (P1) and the outside ambient pressure (Pamb). The current engine inlet pressure loss may be compared to an expected nominal engine inlet pressure loss value for the selected current engine installation configuration to determine the correction factor (DPCORR).

In Step 205, a correction factor for the current normalized engine power (SHPN) may be selected or otherwise determined. The correction factor may be applied to the current normalized engine power to correct for variable inlet loss effects of the gas turbine engine 20. The correction factor for the current normalized engine power (SHPN) may be determined, for example, using one or more data tables including the correction factor (DPCORR) vs. the current engine power (SHP) as a function of the selected current engine installation configuration.

In Step 206, a normalized high-pressure compressor speed (NHC1) for an uninstalled gas turbine engine may be selected or otherwise determined using the corrected current normalized engine power (SHPN), airspeed (e.g., VCAS), altitude, and the selected current engine installation configuration. The uninstalled engine represents a theoretical gas turbine engine of a same type and current engine installation configuration as the gas turbine engine 20. The normalized high-pressure compressor speed (NHC1) for the uninstalled gas turbine engine may be determined based on estimated high-pressure compressor speed (NHC1) values for the theoretical gas turbine engine for the corrected current normalized engine power (SHPN), airspeed (e.g., VCAS), altitude, and the selected current engine installation configuration (e.g., using one or more data tables associated with the uninstalled engine). Selecting or otherwise determining the normalized high-pressure compressor speed (NHC1) may include using one or more data tables including the normalized high-pressure compressor speed (NHC1) vs. the corrected normalized engine power (SHPN) as a function of the selected current engine installation configuration.

In Step 207, a first scaling factor (K1NHC1) may be selected or otherwise determined for the uninstalled normalized high-pressure compressor speed (NHC1) value. The first scaling factor (K1NHC1) may be selected using the corrected current normalized engine power (SHPN), airspeed (e.g., VCAS), altitude, and the selected current engine installation configuration. The scaling factor (K1NHC1) may then be applied to the uninstalled normalized high-pressure compressor speed (NHC1). For example, a normalized high-pressure compressor speed (NHC1) for the gas turbine engine 20 and the aircraft 1000 may be determined (e.g., modeled) using the selected current engine installation configuration. The first scaling factor (K1NHC1) may be applied to the uninstalled normalized high-pressure compressor speed (NHC1) value to correct the uninstalled normalized high-pressure compressor speed (NHC1) value to represent the gas turbine engine 20 with the selected current engine installation configuration.

In Step 208, a second scaling factor (KNHC1) may be selected or otherwise determined for the uninstalled normalized high-pressure compressor speed (NHC1). The second scaling factor (KNHC1) may be selected using the corrected current normalized engine power (SHPN), altitude, and the current ISA Deviation. The scaling factor (KNHC1) may then be applied to the uninstalled normalized high-pressure compressor speed (NHC1). The expected normalized high-pressure compressor speed (NHC1) of Step 106 may be selected or otherwise determined, for example, using International Standard Atmosphere (ISA) temperature values which may be different than the actual outside air temperature (OAT). The scaling factor (KNHC1) may be used to compensate for differences between the ISA temperature and the actual outside air temperature (OAT).

In Step 209, a third scaling factor (K2NHC1) may be selected or otherwise determined using the corrected current normalized engine power (SHPN), altitude, current ISA Deviation, and the selected current engine installation configuration. The third scaling factor (K2NHC1) may then be applied to the uninstalled normalized high-pressure compressor speed (NHC1). The third scaling factor (K2NHC1) may be applied to the uninstalled normalized high-pressure compressor speed (NHC1) to further correct the uninstalled normalized high-pressure compressor speed (NHC1) to represent the gas turbine engine 20 with the selected current engine installation configuration for the current atmospheric conditions (e.g., the outside air temperature (OAT)) for the gas turbine engine 20 and the aircraft 1000.

In Step 210, an accessory extraction load (AGB ex_curr) may be obtained or otherwise determined for the gas turbine engine 20 and the aircraft 1000 (see FIG. 1). The accessory extraction load (AGB ex_curr) may be represented as a value of power (e.g., horsepower (HP)). Obtaining the accessory extraction load (AGB ex_curr) may include measuring a current (e.g., a real time) value of the accessory extraction load (AGB ex_curr) for the aircraft 1000. Alternatively, a value of the accessory extraction load (AGB ex_curr) may be estimated. The estimated accessory extraction load (AGB ex_curr) may be a fixed value. Alternatively, the accessory extraction load (AGB ex_curr) may be a function of one or more operational parameters of the gas turbine engine 20 and/or the aircraft 1000 such as, but not limited to, outside air temperature (OAT), altitude, normalized engine power (SHPN), etc. Alternatively, a zero (0) value may be assumed for the accessory extraction load (AGB ex_curr) to yield a more conservative value for the determined indicated turbine temperature (ITT) margin of the present disclosure Method 100.

In Step 211, an uninstalled normalized high-pressure compressor speed (NHC1) correction factor (e.g., a scalar factor) may be obtained or otherwise determined. The uninstalled normalized high-pressure compressor speed (NHC1) correction factor may be a function of the current normalized engine power (SHPN) and altitude, multiplied by the accessory extraction load (AGB ex_curr). The uninstalled normalized high-pressure compressor speed (NHC1) correction factor may be determined using one or more data tables and/or on-board engine models (e.g., executed by the engine control system 22) with various values of the accessory extraction load (AGB ex_curr) to estimate a sensitivity of the particular gas turbine engine 20 to accessory loads.

In Step 212, the uninstalled normalized high-pressure compressor speed (NHC1) may be added to the expected normalized high-pressure compressor speed (NHC1) correction factor.

At step 213, the environmental control system (ECS) bleed extraction load (ECS_bld) may be obtained or otherwise determined. Obtaining the environmental control system (ECS) bleed extraction load (ECS_bld) may include measuring a current (e.g., a real time) value of the environmental control system (ECS) bleed extraction load (ECS_bld) for the aircraft 1000. Alternatively, a value of the environmental control system (ECS) bleed extraction load (ECS_bld) may be estimated. The estimated environmental control system (ECS) bleed extraction load (ECS_bld) may be a fixed value. Alternatively, the environmental control system (ECS) bleed extraction load (ECS_bld) may be a function of one or more operational parameters of the gas turbine engine 20 and/or the aircraft 1000 such as, but not limited to, outside air temperature (OAT), altitude, normalized engine power (SHPN), etc. Alternatively, a zero (0) value may be assumed for the environmental control system (ECS) bleed extraction load (ECS_bld) to yield a more conservative value for the determined indicated turbine temperature (ITT) margin of the present disclosure Method 100.

In Step 214, an uninstalled normalized high-pressure compressor speed (NHC1) correction factor (e.g., a scalar factor) may be obtained or otherwise determined. The uninstalled normalized high-pressure compressor speed (NHC1)

correction factor of Step 214 may be a function of the current normalized engine power (SHPN), altitude, and the outside air temperature (OAT) for the selected current engine installation configuration, which uninstalled normalized high-pressure compressor speed (NHC1) correction factor may then be multiplied by the environmental control system (ECS) bleed extraction load (ECS_bld) obtained in Step 213. The uninstalled normalized high-pressure compressor speed (NHC1) correction factor may be determined using one or more data tables and/or on-board engine models (e.g., executed by the engine control system 22) with various values of the bleed extraction load (ECS_bld) to estimate a sensitivity of the particular gas turbine engine 20 to bleed extraction loads.

In Step 215, the uninstalled normalized high-pressure compressor speed (NHC1) correction factor obtained in Step 214 may be added to the uninstalled normalized high-pressure compressor speed (NHC1).

In Step 216, the uninstalled normalized high-pressure compressor speed (NHC1) may be de-normalized using the $\Theta_{T1}$ value to obtain or otherwise determine an absolute high-pressure compressor speed (NH) value expressed, for example, as a revolution-per-minute (RPM) value or as a percentage of a reference speed (e.g., a maximum rated speed for the high-pressure compressor). The $\Theta_{T1}$ value may be modified by a factor (EXPITT) (e.g., $\Theta_{T1}$^EXPITT) to account for empirical factors.

In Step 217, an engine NH field margin may be added to the uninstalled de-normalized high-pressure compressor speed (NH) value to obtain or otherwise determine the Fully Deteriorated Engine (FDE) high-pressure compressor speed (NH) value. The engine NH field margin may represent an allowable increase in the de-normalized high-pressure compressor speed (NHC1) value before the gas turbine engine 20 may need to undergo maintenance (e.g., a periodic overhaul).

In Step 218, an NH deterioration correction factor may be applied to the FDE high-pressure compressor speed (NH) value. The NH deterioration correction factor may be a function of a current indicated turbine temperature (ITT) value for the gas turbine engine 20 (see Step 124) and compressor key characteristics and measurements such as, but not limited to fluid flow rate, rotor speed, pressure ratio, temperatures, and the like. The NH deterioration correction factor may be added to the FDE high-pressure compressor speed (NH) value to account for non-linear effects of engine deterioration on the FDE high-pressure compressor speed (NH) value.

In Step 219, an expected FDE high-pressure compressor speed (NH) value may be obtained or otherwise determined based, for example, on the FDE high-pressure compressor speed (NH) value obtained in Step 217 and optionally the NH deterioration correction factor applied in Step 218.

At Step 220, a current high-pressure compressor speed (NH) value for the gas turbine engine 20 is obtained or otherwise determined. The current high-pressure compressor speed (NH) value may be obtained from direct measurements (e.g., using the sensor 66J), by estimating one or more operational parameters of the gas turbine engine 20 based on predetermined correlations with other known operational parameters, and/or by using on-board engine models (e.g., executed by the engine control system 22) to estimate one or more operational parameters of the gas turbine engine 20.

At step 221, an available high-pressure compressor speed (NH) margin is obtained or otherwise determined by subtracting the expected FDE high-pressure compressor speed (NH) value (e.g., obtained from Step 219) from the current high-pressure compressor speed (NH) value (e.g., obtained from Step 220).

Figure 6:
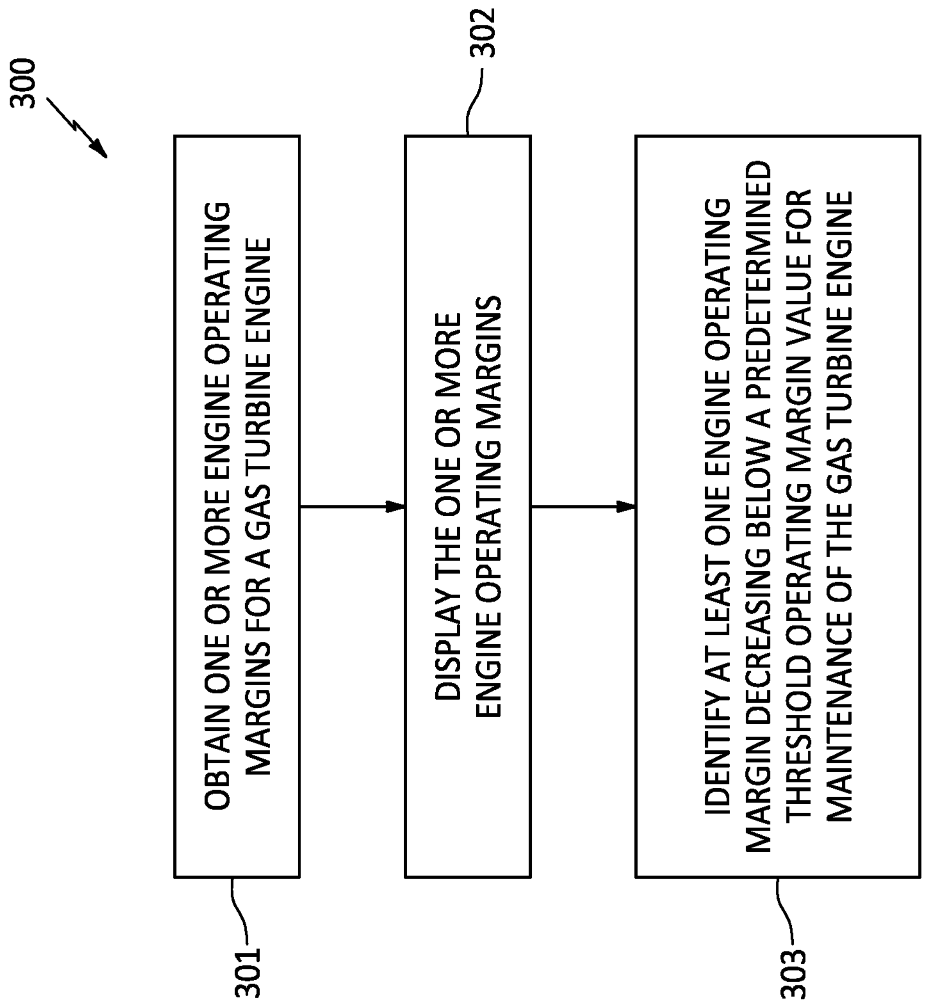
FIG. 6 illustrates a flowchart depicting a method for using an engine operating margin to operate a gas turbine engine, in accordance with one or more embodiments of the present disclosure.

Referring to FIG. 6, a Method 300 for using an engine operating margin (e.g., an available ITT margin or an available high-pressure compressor speed (NH) margin) to operate (e.g., control, manage, and/or maintain) a gas turbine engine (e.g., the gas turbine engine 20) is provided. FIG. 6 illustrates a flowchart for the Method 300. The Method 300 may be performed using the gas turbine engine 20 and engine control system 22. For example, the processor 62 may execute instructions stored in memory 64, thereby causing the engine control system 22 and/or its processor 62 to execute or otherwise control one or more steps of the Method 300. However, while the Method 300 may be described herein with respect to the gas turbine engine 20 and/or the engine control system 22, the present disclosure Method 300 is not limited to use with the gas turbine engine 20 and/or engine control system 22. Unless otherwise noted herein, it should be understood that the steps of Method 300 are not required to be performed in the specific sequence in which they are discussed below and, in some embodiments, the steps of Method 300 may be performed separately or simultaneously.

In Step 301, the engine control system 22 may obtain or otherwise determine one or more engine operating margins (e.g., an available ITT margin or an available high-pressure compressor speed (NH) margin) for one or more engine parameters (e.g., ITT or high-pressure compressor speed (NH)) the gas turbine engine 20 (see FIGS. 1 and 2), for example, using the Method 100 and/or the Method 200. In Step 302, the engine control system 22 may cause the one or more engine operating margins to be displayed. For example, the engine operating margins may be displayed (e.g., on a computer screen, digital display, etc.) for a pilot and/or crew of an aircraft (e.g., the aircraft 1000, see FIG. 1) associated with the gas turbine engine 20. For example, the engine operating margins may provide the pilot and/or crew with a live or substantially live indication of the available power for the gas turbine engine 20. In Step 303, at least one of the engine operating margins may be compared to a predetermined threshold operating margin value. If the engine operating margin decreases below the predetermined threshold operating margin value, the engine control system 22 may flag (e.g., identify) the gas turbine engine 20 for scheduling and/or performance of maintenance. The engine control system 22 may provide a maintenance notification to a pilot, crew, and/or maintenance personnel for an associated aircraft for the gas turbine engine 20.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

The invention claimed is:

1. A system for determining an engine operating margin for an engine parameter of an aircraft, the system comprising:

a gas turbine engine system, the gas turbine engine system comprising a gas turbine engine, an engine control system, and one or more sensors, the gas turbine engine comprising a core flowpath formed by an air inlet, a first rotational assembly, a second rotational assembly, and an exhaust section; and the engine control system including a processor in communication with a non-transitory memory storing instructions, the engine control system in communication with the one or more sensors;

wherein the instructions when executed by the processor, cause the processor to:

obtain a current engine installation configuration for the gas turbine engine stored in the memory;

determine an expected normalized value of the engine parameter for an uninstalled gas turbine engine based on the current engine installation configuration and one or more of a normalized engine power (SHPN) of the gas turbine engine, an airspeed, or an altitude;

determine a scaling factor based on one or more of SHPN, altitude, current International Standard Atmosphere (ISA) deviation, or the current engine installation configuration;

apply the scaling factor to the expected normalized value of the engine parameter;

determine a fully deteriorated engine (FDE) value of the engine parameter using the normalized value of the engine parameter;

determine a current value of the engine parameter for the gas turbine engine from the one or more sensors;

determine the engine operating margin for the engine parameter based on the FDE value of the engine parameter and the current value of the engine parameter, display a live indication of the engine operating margin for the engine parameter on a display of the aircraft; and identify the presence or absence of a need for gas turbine engine maintenance by comparing the engine operating margin to a threshold margin value.

2. The system of claim 1, wherein the engine parameter is an indicated turbine temperature (ITT).

3. The system of claim 1, wherein the engine parameter is a compressor speed.

4. The system of claim 1, wherein the instructions, when executed by the processor, further cause the processor to:

calculate a current engine inlet pressure loss using an engine inlet pressure and an outside ambient pressure;

compare the current engine inlet pressure loss to an expected nominal engine inlet pressure loss for the current engine installation configuration to determine an inlet pressure loss correction factor; and apply the inlet pressure loss correction factor to the normalized engine power (SHPN).

5. A method for determining an engine operating margin for an engine parameter of a gas turbine engine system for an aircraft, the gas turbine engine system including a gas turbine engine, an engine control system, and one or more sensors, the engine control system including a processor in communication with a non-transitory memory storing instructions, and the engine control system in communication with the one or more sensors, the method comprising:

identifying a current engine installation configuration for the gas turbine engine stored in the non-transitory memory of the engine control system;

determining an expected normalized value of the engine parameter for an uninstalled gas turbine engine based on the current engine installation configuration and one or more of a normalized engine power (SHPN) of the gas turbine engine, an airspeed, or an altitude;

determining a scaling factor based on one or more of SHPN, altitude, current International Standard Atmosphere (ISA) deviation, or the current engine installation configuration;

applying the scaling factor to the expected normalized value of the engine parameter;

determining a fully deteriorated engine (FDE) value of the engine parameter using the normalized value of the engine parameter;

determining a current value of the engine parameter for the gas turbine engine with the one or more sensors;

determining the engine operating margin for the engine parameter based on the FDE value of the engine parameter and the current value of the engine parameter, and displaying a live indication of the engine operating margin for the engine parameter on a display of the aircraft;

wherein the displayed engine operating margin signals an operator to perform maintenance on the gas turbine engine when the engine operating margin decreases below a threshold margin value.

6. The method of claim 5, wherein the engine parameter is an indicated turbine temperature (ITT).

7. The method of claim 5, wherein the engine parameter is a high-pressure compressor speed (NH).

8. The method of claim 5, further comprising:

determining an accessory extraction load for the gas turbine engine;

determining an accessory extraction load correction factor using the normalized engine power (SHPN), the altitude, and the accessory extraction load; and adding the accessory extraction load correction factor to the expected normalized value of the engine parameter.

9. The method of claim 5, wherein the step of determining the current value of the engine parameter for the gas turbine engine includes measuring the engine parameter using one or more sensors of the gas turbine engine.

10. The method of claim 5, wherein the step of determining the current value of the engine parameter includes estimating the current value of the engine parameter using a computer-implemented model.

11. The method of claim 5, wherein the step of determining the FDE value of the engine parameter includes determining a deterioration correction factor for the FDE value, the deterioration correction factor based on one or more operational characteristics of a compressor of the gas turbine engine.

12. A gas turbine engine for an aircraft, the gas turbine engine comprising:

an air inlet;

a first rotational assembly including a first shaft, a bladed first compressor rotor, and a bladed first turbine rotor, the first shaft interconnecting the bladed first compressor rotor and the bladed first turbine rotor;

a second rotational assembly include a second shaft, a bladed second compressor rotor, and a bladed second turbine rotor, the second shaft interconnecting the bladed second compressor rotor and the bladed second turbine rotor;

an exhaust section, wherein the air inlet, the first rotational assembly, the second rotational assembly, and the exhaust section form a core flow path of the gas turbine engine;

one or more sensors distributed throughout the gas turbine engine; and an engine control system, the engine control system including a processor in communication with a non-transitory memory storing instructions, and the engine control system in communication with the one or more sensors distributed throughout the gas turbine engine;

wherein the instructions when executed by the processor, cause the processor to:

obtain a current engine installation configuration for the gas turbine engine;

determine an expected normalized value of an engine parameter for an uninstalled engine based on one or more of a normalized engine power (SHPN) of the gas turbine engine, an airspeed, or an altitude;

determine a scaling factor based on one or more of SHPN, altitude, current International Standard Atmosphere (ISA) deviation, or the current engine installation configuration;

apply the scaling factor to the expected normalized value of the engine parameter;

determine a fully deteriorated engine (FDE) value of the engine parameter of the gas turbine engine using the normalized value of the engine parameter;

determine a current value of the engine parameter for the gas turbine engine using the one or more sensors;

determine an engine operating margin for the engine parameter based on the FDE value of the engine parameter and the current value of the engine parameter, and display a live indication of the engine operating margin for the engine parameter on a display of the aircraft;

wherein the displayed engine operating margin signals an operator to perform maintenance on the gas turbine engine when the engine operating margin decreases below a threshold margin value.

13. The gas turbine engine of claim 12, wherein the normalized value of an engine parameter is determined for the current engine installation configuration.

14. The gas turbine engine of claim 13, wherein the current engine installation configuration includes an air inlet configuration.

15. The gas turbine engine of claim 13, wherein the current engine installation configuration includes an exhaust section configuration.

16. The gas turbine engine of claim 12, wherein the engine control system includes a plurality of sensors.

17. The gas turbine engine of claim 16, wherein the plurality of sensors includes at least a speed sensor for the first rotational assembly and a torque sensor for the first rotational assembly, and wherein the step of determining the normalized value of the engine parameter for the uninstalled engine based on the normalized engine power (SHPN) of the gas turbine engine includes determining the normalized engine power (SHPN) using a rotational speed measured by the speed sensor and a torque measured by the torque sensor.

* * * * *